(12) United States Patent
Wong et al.

(10) Patent No.: US 6,592,044 B1
(45) Date of Patent: Jul. 15, 2003

(54) ANONYMOUS ELECTRONIC CARD FOR GENERATING PERSONAL COUPONS USEFUL IN COMMERCIAL AND SECURITY TRANSACTIONS

(76) Inventors: Jacob Y. Wong, 7110 Georgetown Rd., Goleta, CA (US) 93117; Roy L. Anderson, 1433 Dwight Dr., Glendale, CA (US) 91207

(*) Notice: Subject to any disclaimer, the term of this patent is extended or adjusted under 35 U.S.C. 154(b) by 0 days.

(21) Appl. No.: 09/571,707

(22) Filed: May 15, 2000

(51) Int. Cl.⁷ .......................... G06K 19/06; G06K 7/08
(52) U.S. Cl. ........................... 235/493; 235/449
(58) Field of Search ............................. 235/493, 499

(56) References Cited

U.S. PATENT DOCUMENTS

| | | |
|---|---|---|
| 4,102,493 A | 7/1978 | Moreno |
| 4,437,130 A | 3/1984 | Hennessy et al. |
| 4,443,027 A | 4/1984 | McNeely et al. |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,689,478 A | 8/1987 | Hale et al. |
| 4,701,601 A | 10/1987 | Francini et al. |
| 4,707,594 A | 11/1987 | Roth |
| 4,742,351 A | 5/1988 | Suzuki |
| 4,772,782 A | 9/1988 | Nonat |
| 4,791,283 A | 12/1988 | Burkhardt |
| 4,837,822 A | 6/1989 | Crosley et al. |
| 4,849,613 A | 7/1989 | Eisele |
| 4,868,376 A | 9/1989 | Lessin et al. |
| 4,990,759 A | 2/1991 | Gloton et al. |
| 5,130,519 A | 7/1992 | Bush et al. |
| 5,192,947 A | 3/1993 | Neustein |
| 5,220,501 A | 6/1993 | Lawlor et al. |
| 5,317,636 A | 5/1994 | Vizcaino |
| 5,412,192 A | 5/1995 | Hoss |
| 5,426,283 A | 6/1995 | Berthozat et al. |
| 5,471,045 A | 11/1995 | Geronimi |
| 5,473,690 A | 12/1995 | Grimonprez et al. |
| 5,497,411 A | 3/1996 | Pellerin |
| 5,568,121 A | 10/1996 | Lamensdorf |
| 5,585,787 A | 12/1996 | Wallerstein |
| 5,590,038 A | 12/1996 | Pitroda |

(List continued on next page.)

FOREIGN PATENT DOCUMENTS

| | | |
|---|---|---|
| AU | 732877 | 12/1998 |
| EP | 0 661 675 A2 | 7/1995 |
| EP | 0 722 241 A2 | 7/1996 |
| JP | 355143679 A | 11/1980 |
| JP | 402148374 A | 6/1990 |
| JP | 405040864 A | 2/1993 |
| WO | WO 99/38129 | 7/1999 |
| WO | WO 99/49424 | 9/1999 |
| WO | WO 99/57675 | 11/1999 |
| WO | WO 00/25262 | 5/2000 |
| WO | WO 00/30048 | 5/2000 |
| WO | WO 00/49586 | 8/2000 |
| WO | WO 00/52900 | 9/2000 |
| WO | WO 00/54208 | 9/2000 |
| WO | WO 01/46902 A1 | 6/2001 |
| WO | WO 01/50429 A1 | 7/2001 |
| WO | WO 01/54082 A1 | 7/2001 |

*Primary Examiner*—Thien M. Le
*Assistant Examiner*—Lisa M. Caputo
(74) *Attorney, Agent, or Firm*—Roy L. Anderson

(57) ABSTRACT

An electronic card that can function as an anonymous credit card or banking card for use on or off the Internet utilizes a magnetic storage medium affixed to the card that can be read by a standard magnetic stripe reader. An encoder generates a data packet that is stored in a designated portion of the magnetic storage medium, which can be a magnetic stripe. The data packet can contain a personal coupon and an alias. A computer or microprocessor generates the personal coupon after a Personal Identification Number is input into the card.

18 Claims, 9 Drawing Sheets

U.S. PATENT DOCUMENTS

| | | |
|---|---|---|
| 5,627,355 A | 5/1997 | Rahman et al. |
| 5,655,008 A | 8/1997 | Futch et al. |
| 5,689,247 A | 11/1997 | Welner |
| 5,745,555 A | 4/1998 | Mark |
| 5,754,652 A | 5/1998 | Wilfong |
| 5,754,653 A | 5/1998 | Canfield |
| 5,818,030 A | 10/1998 | Reyes |
| 5,825,871 A | 10/1998 | Mark |
| 5,831,862 A | 11/1998 | Hetrick et al. |
| 5,834,747 A * | 11/1998 | Cooper ................. 235/449 |
| 5,834,756 A * | 11/1998 | Gutman et al. ............ 235/380 |
| 5,844,497 A | 12/1998 | Gray |
| 5,883,810 A | 3/1999 | Franklin et al. |
| 5,905,246 A * | 5/1999 | Fajkowski ................. 235/375 |
| 5,913,203 A | 6/1999 | Wong et al. |
| 5,915,226 A | 6/1999 | Martineau |
| 5,917,168 A | 6/1999 | Nakamura et al. |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A | 9/1999 | Wong et al. |
| 6,000,832 A | 12/1999 | Franklin et al. |
| 6,003,763 A * | 12/1999 | Gallagher et al. .......... 235/379 |
| 6,012,634 A | 1/2000 | Brogan et al. |
| 6,012,636 A | 1/2000 | Smith |
| 6,024,288 A * | 2/2000 | Gottlich et al. ............ 235/380 |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,047,268 A | 4/2000 | Bartoli et al. |
| 6,050,493 A | 4/2000 | Fertig |
| 6,068,184 A | 5/2000 | Barnett |
| 6,068,192 A | 5/2000 | McCabe et al. |
| 6,075,861 A | 6/2000 | Miller, II |
| 6,089,451 A | 7/2000 | Krause |
| 6,101,477 A | 8/2000 | Hohle et al. |
| 6,132,799 A | 10/2000 | Corniglion et al. |
| 6,163,771 A | 12/2000 | Walker et al. |
| D436,620 S | 1/2001 | Webb et al. |
| 6,188,309 B1 | 2/2001 | Levine |
| RE37,122 E | 4/2001 | Levine |
| 6,215,665 B1 | 4/2001 | Martin |
| 6,224,109 B1 | 5/2001 | Yang |
| 6,227,447 B1 | 5/2001 | Campisano |
| 6,230,977 B1 | 5/2001 | Johnson |
| 6,257,486 B1 | 7/2001 | Teicher et al. |
| 6,339,766 B1 | 1/2002 | Gephart |

\* cited by examiner

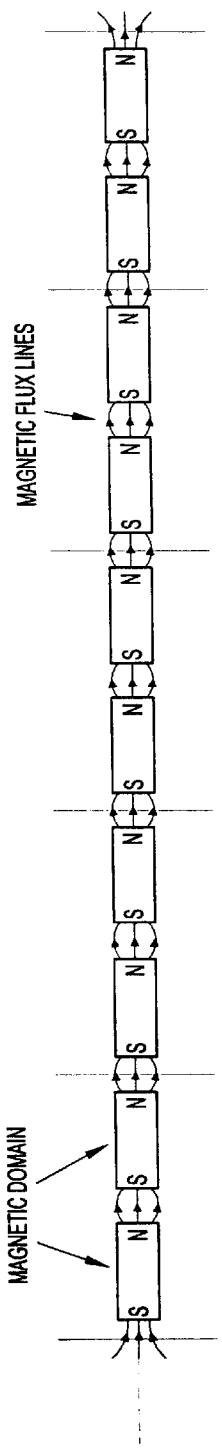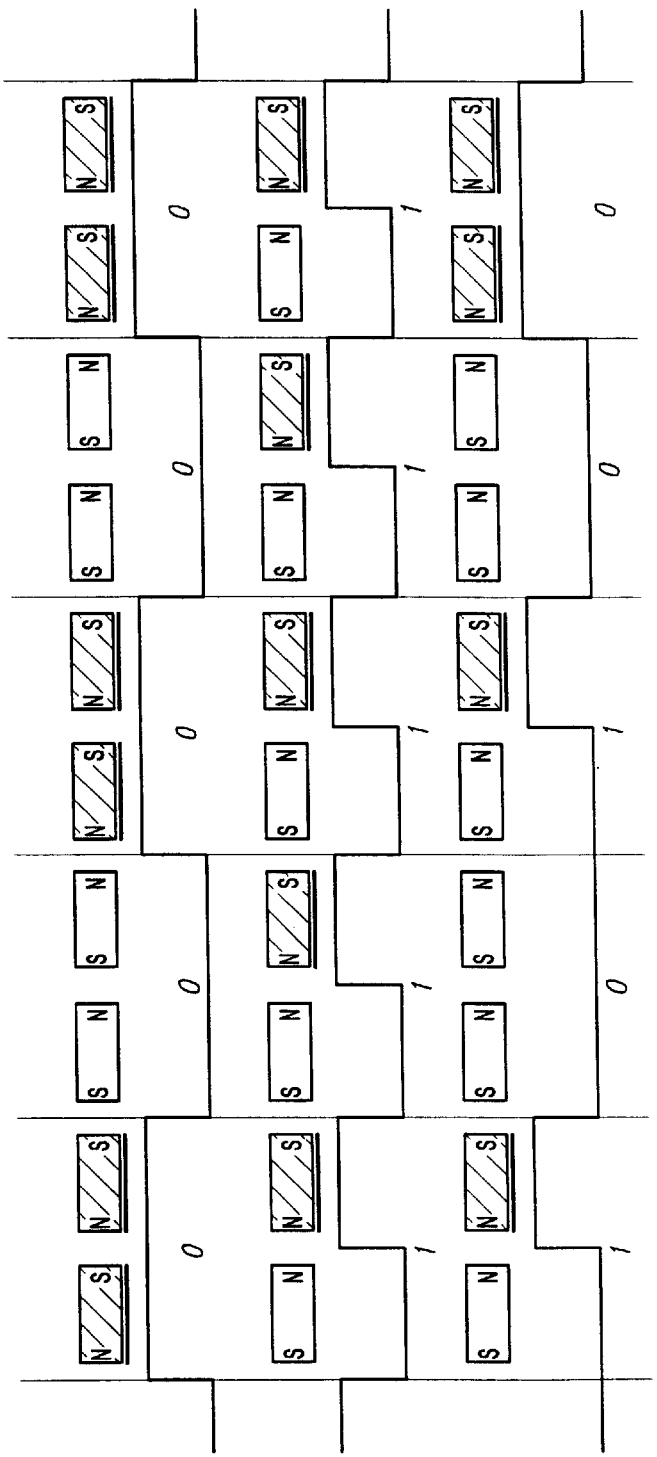
FIG. 7A
FIG. 7B

ANONYMOUS ELECTRONIC CARD FOR GENERATING PERSONAL COUPONS USEFUL IN COMMERCIAL AND SECURITY TRANSACTIONS

FIELD OF THE INVENTION

The present invention is in the field of credit cards and other cards, such as banking cards, which contain information in a magnetic stripe.

BACKGROUND OF THE INVENTION

Credit cards have been used for decades. A credit card typically has a 16-digit number (credit card number), a 4-digit number (expiration date), and a cardholder's name and business affiliation (if any) embossed on the front side of the card. The logo of the credit association or acquiring bank, or both, is also printed on the front side. On its back side is a magnetic stripe wherein all the pertinent personal information of the cardholder, such as primary account number, name, expiration date and encrypted Personal Identification Number (PIN) are encoded. The information contained in the magnetic stripe is not visible or readable directly from the card except with the use of special decoding equipment, such as a magnetic stripe reader. Also appearing on the backside is a space for accommodating the cardholder's personal signature and more printed information about the credit card issuer and/or Automatic Teller Machine (ATM) locations.

Prior to the ever-increasing use of online credit card purchases of good and services on the Internet over the past several years, there were only two common forms of credit card transactions used by the general public. According to the parlance of the credit card industry, the first form of transaction is dubbed "face-to-face." A face-to-face transaction is one when the merchant establishes visual contact with the cardholder and the credit card and is therefore able to check the signature, verifying expiration date, etc. during a transaction. The second form of transaction is dubbed "MOTO" which stands for "Mail Order Telephone Order". A MOTO transaction is one when the consumer uses mail, phone or facsimile to order goods or services and the merchant does not have direct visual contact with the credit card or the credit card holder.

Unauthorized or fraudulent use of credit card purchases for goods and services has been with the industry ever since its inception. Although consumers generally face little financial risk because federal law caps consumer liability for unauthorized charges on credit cards at $50, the loss to merchants and card issuers is far more significant and amounts to hundreds of millions of dollars per year. For face-to-face transactions, if the unauthorized use of a credit card occurs despite the merchant following all the rules established by the credit card associations, it is the issuer or acquiring bank that will be responsible for such a loss. For MOTO transactions, on the other hand, it is the merchant that will bear the brunt of the responsibility for fraudulent credit card charges. With the advent of the Internet and the incredible rate of increase in online credit card transactions for goods and services, the issue of credit card fraud has once again grasped the attention of the industry. Since an online credit card transaction is treated as a MOTO transaction, it is merchants that bear the brunt of the responsibility if any fraud should occur.

Over the past two decades, many different ideas, methodologies and hardware have been advanced in the field of credit card transactions with the hope of providing a more secure credit card to the user. These efforts have, in large part, been especially concerned with protecting against stolen credit cards or their unauthorized use by a perpetrator who falsely assumes someone else's identity. While the prior art is replete with various and diverse secured or even smart credit card systems, credit card fraud is still a serious and widespread problem. This is because many attempts to provide a smart, secure credit card system in the past have proven to be too complex and user-unfriendly, and this is believed why such cards, with the exception of American Express' Smart or Blue Card (see below), have not gained user acceptance.

One conspicuous example among many can be found in U.S. Pat. No. 4,614,861 issued in 1988 to Parlov et al. In this patent, the inventors advanced the idea of a unitary, self-contained credit card which has the ability to verify a personal identification number (PIN) which is entered directly into the card by way of a keyboard without the use of an outside terminal. Furthermore, a transaction identification code (TIC), which varies for each transactional use of the credit card, is automatically generated for later transaction validity verification after a valid PIN is entered and accepted by the card. While the methodology advanced at the time was indeed novel in its capability of eliminating unauthorized or fraudulent use other than by the card owner, it suffered nonetheless from a number of major drawbacks. First and foremost is the complexity of the system itself. The instructions of how to use the credit card alone are a major burden to card owners in order to ready the card for even a simple routine transaction. In other words, the credit card system is extremely user-unfriendly. Second, the system requires the additional use of a peripheral device and also a card validation device in order to safeguard and facilitate the transaction algorithm for achieving the level of security for the system. Such a requirement of additional equipment further complicates the utility and elevates the already expensive components cost of the system. Third, the system is incompatible with existing credit card transaction infrastructure and merchants who opt to use such a system must invest in new and expensive equipment in order to reap the system benefits. Consequently, such a credit card system has not achieved a widespread level of acceptance and usage by the general public.

In U.S. Pat. No. 4,650,978 issued to Hudson et al. in 1987, a similarly complicated "bank" cash card system is advanced for handling fund transfer transactions between a payor and a payee having a magnetic "hysteresis" security arrangement. A cash card has a magnetic stripe on which the available cash balance, the identification and security information are scramble recorded. A transaction register machine reads data from the card, carries out the transaction and records the new account balance on the card. The modified information is "restored" on the card in the form of a re-scrambled code. The transaction register machine also includes a magnetic tape of the cassette type or disk for storing each transaction thereon for further processing of the information at a remote data processing center. The transaction register machine further includes a main keyboard on the side of the payee for displaying the cash balance, for entering the total amount of the sale and recording the new cash balance on the card. The main keyboard is responsive to the cardholder's keyboard which has a slot for insertion of the card for verification by entering the correct identification number known only to the card holder. Again, the complexity of such a system, together with its inherent incompatibility with the existing credit card transaction infrastructure, has proved to be too much of a barrier for the system to be widely accepted and implemented by the financial community.

In U.S. Pat. No. 4,868,376 issued to Lessin et al. in 1989, a general purpose, re-programmable intelligent card is advanced. The card includes an alphanumeric keyboard, an alphanumeric display and one or more input/output ports controlled by a microprocessor and programs stored in a memory associated with the microprocessor. The microprocessor is provided with an operating system and may be programmed or reprogrammed for a specific application or for a variety of applications. While the card can serve multiple functions, it still suffers from several drawbacks that prevent it from being widely accepted by the general public, including its complexity in use, its innate incompatibility with existing credit card transaction infrastructure and the resultant high cost of operating such a system.

In U.S. Pat. No. 5,818,030 issued to Reyes in 1998, a secure, smart credit card having the same basic dimensions of a standard credit card is advanced. This invention provides a security system that uses the concept of a key, which, when removed, prevents unauthorized use of the card. The so-called dual device system has two parts. A first part is a micro programmable central unit (CPU) in the main body. The second part is an engageable intelligent micro memory module that functions as a key unit and is configured to join the main body to form an engaged unit having the general dimensions and appearance of a "smart credit-type card." The CPU of the main body and instructions are designed to operate in conjunction with the external intelligent micro memory module or key unit. The key unit stores the programs and date required by the processor CPU in the main body to allow the user to operate the credit card system. Although such a credit card system has the ability to help prevent unauthorized or fraudulent use, it is unlikely that this system will be widely accepted in the financial community because of its operational complexity from the user's standpoint, and its questionable compatibility with the prevalent credit card transaction infrastructure.

In U.S. Pat. No. 6,012,636 issued to Smith in 2000, a multiple application card data system is comprised of a data management device and a user card (a dual component system). This credit card system is, by design, rather complicated. A user can carry a single card that may be modified at will to, in effect, be a clone for any one of the user's provider data cards, through use of a companion data management device that can store data from a plurality of provider data cards. However, the system requires a user's interaction in order to transfer data from the data management device to the user card. In addition, the data management device also stores a digital data representation of the user's fingerprint for verifying the user's identity when compared with an actual scanning of the user's fingerprint image by the same device during the process of verification. Thus, the user's identification verification is by no means a simple procedure. Furthermore, the user card itself comprises two memories for storing data. The first memory stores data issued by a service provider and the second memory stores a set of data unique to the user. Before the user's scanned fingerprint image can be used for identification purposes, the data management device must first verify the data contents of the two memories resident on the user card. Without even raising the issue of the questionable public acceptance today with regards to using fingerprint imaging as a form of personal identity, the procedures the card user must endure in order to safeguard the card's security against unauthorized usage are far too complicated.

It is believed that a much simpler card system can work just as well against unauthorized fraudulent use of credit cards without such burdensome overhead.

In U.S. Pat. No. 5,317,636 issued to Vizcaino in 1994, a method and apparatus for securing credit card transactions is advanced. This invention relates to the apparatus of authorizing credit card transactions and includes a system which is made up of an authorization computer and a credit card that work in conjunction to enhance the security of credit card transactions. More specifically, the system includes a smart credit card that includes a microprocessor processor, associated memories and a liquid crystal display. The credit card is used to produce a unique verification number by processing a transaction sequence number with an encryption algorithm. The verification number is then displayed in the display device, and can be transmitted to the authorization computer along with a customer identifying account number. The computer, which is used for authorizing the credit card transactions for the customers of the credit card issuer, uses the account number to access an account file for the credit card customer. That account file has general account data for the given customer, as well as a transaction sequence number, which corresponds to the transaction sequence number stored in the credit card. Additionally, the account file includes a de-encryption algorithm, which is complementary to the encryption algorithm of the credit card, such that the computer can use the de-encryption algorithm together with the verification number to produce a computed transaction sequence number.

The computed transaction sequence number is compared to the transaction sequence number stored in the computer to determine whether the two numbers correspond to one another. If they do, then the computer will authorize the transaction, if they do not, then the transaction will be rejected.

Both transaction sequence numbers, the one in the card and the one in the computer, are changed, preferably by increment, after the authorized transaction so that a different verification number is generated and used in the authorization of each different credit card transactions. Thus, the verification number used in one given transaction will not be useful in a subsequent transaction. Therefore, even if someone were to see the verification number used in one transaction, they would not be able to use it in a subsequent transaction.

This invention truly advances a viable methodology for preventing unauthorized usage for credit card transactions. However, such a methodology still has drawbacks. One drawback is that crucial information pertaining to the card holder and the encryption algorithm resident in the memory of the resident microprocessor on the card are not immune from discovery by modern day electronic piracy. Because the credit account number and the verification number generated for each transaction are both visibly made available to the merchant so they can be sent to a remote processing center for subsequent authorization, once the contents of a card is illegally obtained, there is no way to safeguard against subsequent large scale fraud. Another drawback is that transmittal of the encrypted verification number, which is an alphanumeric number comprising 14 or more characters, rather than a 4-decimal character PIN, along with the user identifying credit card number, might not be compatible with existing credit card transaction infrastructure. In the real world, this represents a major roadblock for whether or not such a system will be accepted by the financial community.

In U.S. Pat. No. 5,627,355 issued to Rahman et al. in 1997, security equipment protecting the relaying of account numbers and personal identification numbers (PIN) by telephonic or other communication link is advanced. The equipment includes a host computer and a remote portable transaction device that interact with one another. A credit granting institution generates an account number and a series of unique personal identification numbers for each account number. This information is stored in the host computer's memory and is assigned as a reference series to an individual customer account number. An identical series of numbers in the same sequence is stored in the memory of the remote device. In operation, the customer account on the host computer is activated and the host computer's memory is indexed sequentially to the first number in the reference series. During use of the remote device, a unique personal identification number is added to the customer account number and transmitted to the host computer. There it is compared to the account number and personal identification number in the reference series. The computer will authorize the transaction if the number in the stored series is identical to the number in the reference series; otherwise the transaction will be denied or questioned.

The method advanced in U.S. Pat. No. 5,627,355 for preventing theft of credit information, in particular the personal identification numbers (PIN), has a number of operational disadvantages. In this patent's teaching, the credit card number is always visible for use by anybody getting hold of the card. This number, along with a special PIN visibly generated on command on the card which varies sequentially in synchronism with the issuer from transaction to transaction, must be passed on to the credit granting institution for authorizing the transaction. Even though the PIN is unique for each transaction, there is nothing to stop anyone in possession of a stolen card from sequentially generating the right combination of the PIN and account number, even though it might take some time to successfully carry out an unauthorized transaction.

Furthermore, it is operationally questionable whether or not the method taught in U.S. Pat. No. 5,627,355 (Rahman et al.) is actually scaleable. Because the host computer has to store so many PIN numbers (literally hundreds for each customer alone that has multiple credit cards from different providers), access time and memory capacity of the host computer may become critical parameters in terms of whether the processing system will function smoothly as the number of card holders grows larger. The same worry also applies to occasional but unavoidable system glitches when such a huge quantity of numbers has to be reconciled.

In U.S. Pat. No. 5,955,961 issued to Wallerstein in 1999, a programmable transaction card is proposed. Such a programmable transaction card enables accessing a selected one of a plurality of different accounts with the same or different financial institutions through communication with an authorization center while providing important anti-fraud features. The transaction card includes a keyboard for selecting a desired account and for entering optional identification information for the card. The transaction card generates an account number corresponding to the selected account. The account number, together with the identification information, if entered, is presented in a form that is readable by a reader device but is not discernable by the human eye, e.g. by emulation of a magnetic strip or an optical pattern. After a reader device (magnetic or optical reader) reads the account number and the identification information during a transaction, the account number and the identification information are transmitted to the authorization center for verification and access to the selected account.

At first glance the programmable transaction card advanced in U.S. Pat. No. 5,955,961 (Wallerstein) has packed away too many features in it so as to render it rather cumbersome and complicated to use, expensive to implement and user-unfriendly. For example, when data presentation takes the form of a magnetic strip, a rather bulky inductor coil (electromagnet) must be deployed and form part of the card itself in order to generate the time-varying magnetic field needed for transmitting the encoded information to a conventional magnetic reader. Inclusion of such an inductor on the transaction card will certainly make it bulkier, and it is questionable whether it is actually compatible with most magnetic strip readers which read data via swiping the magnetic strip through a static reader head. Also, incorporation of the feature of being able to select from a plurality of different accounts necessitates the use of an awkward thumb-wheel switch on the card, which is less user-friendly. The same applies to the situation when tonal identifying controls are added to the card, which will certainly make the latter even more bulky. Furthermore, it is questionable whether credit card users would even know or appreciate how to use the tonal identification features of this transaction card.

Technically speaking, the use of a time-varying magnetic field to transfer information encoded on the transaction card to a conventional magnetic stripe reader is highly risky and certainly represents a big deviation from the normal magnetic data transfer interface. When all these extra but not necessarily useful features (at least for most ordinary credit card holders) are incorporated into this transaction card, such a card will be much more complicated and less friendly to use.

Starting out in Europe a few years back, a new kind of credit card was introduced, called the "SmartCard," with the hope of using new technologies to combat fraudulent online credit card transactions. Such a card actually includes a microchip and a card reader to connect to a user's personal computer (PC). With the use of the card reader, all transaction information, including personal information pertaining to the cardholder, are heavily encrypted with the most advanced security standard before such information is sent out over the Internet. However, such encryption requires special equipment provided to the cardholder. And, despite heavy promotional and advertisement expenditures, the SmartCard system has not yet been well received in the United States.

In summary, all of the above-noted advancements of credit card system ideas, methodologies and hardware are primarily directed to security aspects of credit cards, particularly against stolen cards or perpetrators illegally assuming somebody's identification after successfully intercepting the individual's personal and financial information on or off the Internet. However, nearly all of the systems proposed to date are either too complicated, tending toward overkill in some cases, or user-unfriendly, or too costly to implement or simply incompatible with existing credit card transaction infrastructure. Thus, there is a long-felt need for a simple, user-friendly, low-cost way to deter credit card fraud in an existing infrastructure-compatible credit card system.

In addition, there has been a failure to recognize, much less address, issues of privacy or anonymity associated with the use of credit cards in general. This has become an even greater concern as credit cards are being used to conduct transactions over the Internet. While consumers are protected from large financial losses that may occur through Internet credit card fraud, they are not protected from potential loss of consumer personal privacy while doing business on the Internet. To execute an online credit card purchase, a consumer has to supply a merchant with the consumer's name, address and a valid credit card number, in addition to the kind of merchandise or service that the consumer is buying. Although such a transaction may appear no different than executing a telephone order, it is far different because the consumer's personal information is up for grabs by anybody capable of intercepting such information as it is transmitted through the Internet. This is a very serious concern in view of the increasingly widespread and prevalent practices of data collection that are being used to profile buying habits of online consumers, especially as profiling extends to such information as buying habits, buying frequency, dollar value and merchandising taste.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity in credit card purchases on the Internet.

Accordingly, a novel, self-contained electronic device that allows credit card holders to execute secure and anonymous credit card transactions on and off the Internet using the methodology set forth in U.S. Pat. No. 5,956,699 will significantly advance the state of the art with respect to preventing credit card fraud and provide a vehicle for protection of consumer privacy.

SUMMARY OF THE INVENTION

The present invention is generally directed to an electronic card that contains a magnetic storage medium and an encoder for generating a data packet that is stored in a designated portion of the magnetic storage medium that can be read by a standard magnetic stripe reader. The electronic card also contains a card base, a computer or microprocessor, a display, an input mechanism and a power source.

In a first, separate aspect of the present invention, the magnetic storage medium is a magnetic stripe, the card base is a flexible printed circuit board, the display is a liquid crystal display and the input mechanism is a keypad. A protective film can encapsulate at least a portion of the printed circuit board and the components attached to it. The magnetic stripe can have three tracks, and it is preferred that the designated portion be located on the second track. The encoder can generate the data packet by creating flux reversals in ferromagnetic particles contained in the magnetic stripe. The data packet can be temporarily stored in the designated portion of the magnetic stripe, and it can be erased by activation of an erasure mechanism.

In another, separate aspect of the present invention, the magnetic storage medium and the encoder are comprised of a dynamic thin film magnetic encoder.

In still another, separate aspect of the present invention, the data packet contains data representing a personal coupon and an alias that are readable by a standard magnetic stripe reader. The personal coupon and the alias can be used to conduct credit card transactions on or off the Internet. The data packet can also be used in a security device.

In still a further, separate aspect of the present invention, one or more special function switches are used to control the function of the electronic card.

Accordingly, it is a primary object of the present invention to provide an electronic card that can be used for commercial and security transactions in which an input is needed to control the function of the card.

This and further objects and advantages will be apparent to those skilled in the art in connection with the drawings and the detailed description of the preferred embodiment set forth below.

BRIEF DESCRIPTION OF THE DRAWINGS

FIG. 7A is an un-coded portion of a track of a magnetic stripe having 5 bit cells showing no flux reversals.

FIG. 7B shows a representation of all "0", all "1" and "0" and "1" side by side according to the Aiken Biphase encoding code.

DETAILED DESCRIPTION OF THE PREFERRED EMBODIMENTS

Figure 1:
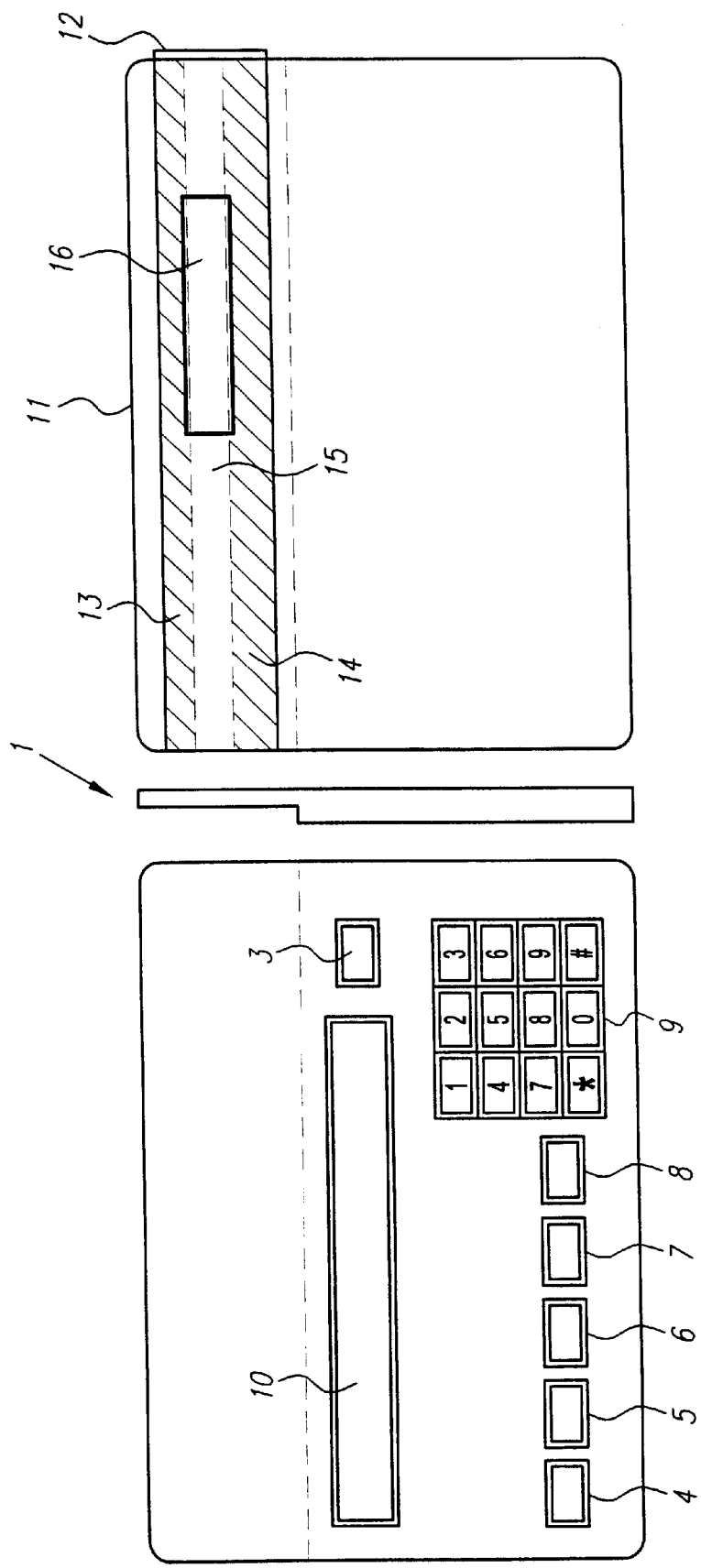
FIG. 1 is a physical layout of a preferred embodiment of a Universal Anonymous Credit Card (UACC) in accordance with a preferred embodiment of the present invention.

The present invention is particularly well suited for use in practicing the inventions taught in U.S. Pat. Nos. 5913,203, 5,937,394 and 5,956,699, the disclosures of which are all specifically incorporated herein by reference.

In the preferred embodiment of the present invention, a unitary, self-contained electronic device is provided having physical planar dimensions that are essentially identical to those of a conventional magnetic stripe credit card, which is widely used in electronic commerce today. The device has seven basic components, although it is possible to combine some of these components together.

The first component is the card base. The other components, in one way or another, are attached to this base.

The second component is a computer. It is preferable that the computer be a single integrated chip, but it need not be. A computer typically contains a central processing unit connected to both storage memory and random access memory (RAM). RAM is used to load and run application programs as well as for storing data during run time. The storage memory can hold a variety of computer programs.

The third component is a display controlled by the computer. In the preferred embodiment, this is a liquid crystal display (LCD). The LCD can be controlled by a LCD driver, and the LCD driver can be contained in storage memory of the computer. In an alternative embodiment, the third component could be an electronic ink display, which is a novel and newly available display medium. The electronic ink display can be fabricated with highly flexible physical dimensions, especially in thickness, which is likened to a thin piece of paper and also much cheaper to manufacture than conventional LCD display.

The fourth component is an input mechanism. In the preferred embodiment, this is a keypad. However, it is possible that the input mechanism might rely upon voice recognition as this technology becomes more and more developed.

The fifth component is a magnetic storage medium. In the preferred embodiment, this is a magnetic stripe.

The sixth component is an encoder for generating a data packet that is stored in a designated portion of the magnetic storage medium. This component is what allows the electronic device to be dynamic by relying upon an input to generate the data packet.

The seventh component is a power source. In the preferred embodiment, this is a battery or a solar cell.

A primary function of this electronic device, which shall be referred to as the Universal Anonymous Credit Card (UACC), is to allow a credit cardholder to execute secure and anonymous credit card transactions on and off the Internet in accordance with the teachings of U.S. Pat. No. 5,956,699. This can be done in a system and in methodology in which merchants no longer have access to the cardholder's real name, address and the actual valid credit card number. Such an effectual personal encryption does not, however, prevent the additional use of an Internet standard encryption such as SSL or SET for online data exchanges. The latter will simply make such online transactions even more secured.

For purposes of clarification and illustration, an example of an application that uses the methodology taught in U.S. Pat. No. 5,956,699 is presented here. Assume that the valid credit card number (VCCN) and the PIN number are, respectively:

VCCN=4678 0123 4567 8012 1200
PIN=2468

Next, assume that the application uses an algorithm that first deletes four (4) digits from the VCCN and then inserts in their place the PIN according to the insertion sequence indicated by a so-called PIN Sequence Insertion Number (PSIN) in order to come up with the scrambled Anonymous Credit Card Number (ACCN), also containing 20 digits. The 4-digit PSIN number can either be chosen by the cardholder or assigned by the issuer. Let us assume for this example that the cardholder's PSIN is 1357.

Next, assume that the algorithm only operates on digits 5 through 6 of the VCCN. This takes into account the fact that the first 4 digits of the standard VCCN denote the identification of the credit card issuer and the last 4 digits of the standard VCCN are reserved for the expiration date, all of which should be left undisturbed. Thus, it is the middle 12 digits that indicate the account number for the cardholder of the VCCN. Therefore, the algorithm calls for the cardholder to first delete the last four digits of the 12-digit account number. In this example the 4 digits to be deleted will be "8012". The 8-digit number before the cardholder PIN is inserted according to the cardholder's PSIN is "0123 4567".

Now the algorithm defines the numbering convention of the digit positions in the ACCN. The first digit position is defined as the zeroth ($0^{th}$) and the second is the first ($1^{st}$) etc. Thus, according to the PISN 1357, the PIN 2468 should be inserted to form the ACCN as follows:

ACCN=4678 021426384567 1200

The 4 digits of the PIN=2468 occupy, respectively, the $1^{st}$, $3^{rd}$, $5^{th}$ and $7^{th}$ positions (according to PISN=1357) using the defined digit position numbering convention. In a simpler algorithm for inserting the PIN, the PIN number itself can act effectively as the PSIN so that the cardholder does not have to remember two numbers. Using such an algorithm, in the example above, the ACCN will now be:

ACCN=4678 012243648567 1200

The 4 digits of the PIN=2468 also occupy, respectively the $2^{nd}$, $4^{th}$, $6^{th}$ and $8^{th}$ positions of the ACCN (according to an implicit PSIN=PIN=2468) using the defined digit position numbering convention.

The applications of the teachings of U.S. Pat. No. 5,956,699 just described can be used in a system that reduces fraud while protecting consumer privacy through anonymous transactions, on and off the Internet. Such a system has three main components that are provided to complete a commercial credit card transaction. First, instead of using a valid credit card number, an ACCN is used. Second, instead of using the cardholder's real name, an alias is used. The alias can be selected by the cardholder or the issuer of the credit card, but it has to be known by both. Third, instead of using a cardholder's real address, a "Proxy Agent" is used to conceal the cardholder's actual address and still comply with current credit card transaction regulations. In such a system, the use of a credit card for transactions on the Internet can be anonymous to all except the cardholder and the credit card issuer.

In order to reduce the cost of use of the UACC, and increase the range of applications in which it can be used, the UACC should have a magnetic storage medium that can be read by a standard magnetic stripe reader. This means that the magnetic storage medium must be capable of being read by a standard magnetic stripe reader. It also means that the portion of the UACC containing the magnetic storage medium must be sized such that the magnetic storage medium will work with standard magnetic stripe readers. A standard magnetic stripe reader works by passing the magnetic stripe portion of a card, such as a credit card, through the magnetic stripe reader in a swiping motion. Standard magnetic stripe readers have been prevalent in retail stores throughout the United States for many years.

An especially preferred embodiment of the present invention will now be described in even greater detail. The especially preferred embodiment uses a standard microprocessor having its usual Central Processing Unit (CPU), Read-Only-Memory (ROM), Random-Access-Memory (RAM) and Input-Output devices (I/O). There are two types of ROMs in the UACC. The first type is a standard semiconductor ROM, ROM1, fabricated as part of the microprocessor. ROM1 stores the microprocessor operating system and also the bulk of the methodology software. The second type of ROM, ROM2, is a portion of a magnetic stripe, namely Tracks 1 and 3. ROM2 stores the relevant information about the cardholder such as primary account number VCCN, name, expiration date, encrypted PIN etc. There are also two types of RAMs in the UACC. The first type of RAM, RAM1, is a standard semiconductor RAM as part of the microprocessor and needed for its normal operation. The second type of RAM, RAM2, is a portion of a magnetic stripe, namely Track 2. RAM2 temporarily stores the encoded ACCN to be read by a standard magnetic stripe reader during a normal credit card transaction after the cardholder inputs the PIN according to the PSIN algorithm into the UACC.

The methodology software is installed into ROM1 of the microprocessor during production. A standard parallel port Input Device serves to interface a numeric keypad and other functional switches of the UACC to the microprocessor. The UACC also has two Output Devices. The first Output Device is a standard parallel output port of the microprocessor used for interfacing to it a 10- or more character alphanumeric LCD display through a driver for outputting information such as recalling from memory alias or typed in PIN verification. It is also used for production testing and repair or servicing of the UACC. The second Output Device is an integrated circuit (IC) magnetic encoder unit built into the UACC so as to encode Track 2 of the magnetic stripe or RAM2, either statically in conjunction with the existing magnetic stripe, or dynamically without the use of the existing magnetic stripe, with the temporary ACCN information for off the Internet credit card transactions. In this especially preferred embodiment of the present invention illustrated below, only the static magnetic encoder working in conjunction with the existing magnetic stripe is described in detailed. For those skillful in the art, the dynamic thin film magnetic encoder, working without the use of the existing magnetic stripe, can also be used in the present invention as an alternative embodiment. In a preferred embodiment of the present invention, the UACC also contains a battery cell, ON/OFF and other functional switches to render it a fully functional and self-contained credit card (see FIG. 1).

The UACC bridges the old economy world of brick and mortar to the new economy world of the Internet. The integrated circuit (IC) magnetic encoder with current-carrying conductive writing heads is fabricated on a flexible and ultra-thin polymer (e.g. polyimide) printed circuit board (PCB) intimately in contact with the magnetic stripe located above for data impression. The encoder driver and digital logic chips are also mounted on the flexible PCB, but in different areas to form the complete IC magnetic encoder. The IC magnetic encoder is technically compatible with conventional magnetic data transfer methodology and makes possible the fabrication of the present UACC with physical dimensions exactly like those for a regular magnetic stripe portion of a credit card.

When the UACC is used in a retail transaction, by merely entering one's own PIN into the UACC prior to giving it to the merchant for swiping the credit card transaction, one takes full advantage of the secure and anonymous transaction afforded by the UACC. The user can first check his or her alias and entered PIN (note that the PIN is never stored in the UACC) using the LCD display on the UACC before the UACC is handed it over to the merchant. Since the cardholder has in effect already signed the transaction with a digital signature (his or her PIN), no additional hand signature is required to complete the transaction. The merchant only need receive the PIN-modified anonymous credit card number (ACCN) and the user's alias. The ACCN and the alias are read by a conventional magnetic stripe reader and are processed in exactly the same fashion as a conventional credit card number and credit cardholder name since such information can be sent to a credit card approval agent for approval of the transaction. The credit card approval agent has all of the information necessary to determine if the transaction is valid or fraudulent. The identity of the entity who authorized the credit card, as well as it expiration date, is available in the ACCN in just the same manner as it is available in a conventional credit card transaction. The card number is verified by confirming the card number contained in the ACCN as valid for the alias.

To use the UACC for Internet transactions, a cardholder first enters the PIN into the UACC exactly like that for off the Internet transactions. Next, the cardholder continues the transaction using only the cardholder's alias, the ACCN appearing in the LCD display and also the cardholder's choice of trusted delivery (optional) should the cardholder prefer to make this transaction completely anonymous. Thus, by carrying just one UACC which looks and feels exactly like a regular magnetic stripe credit card, one is now able to make old world credit card transactions like one always has done in the past. But, more importantly, one can now use the same UACC for making secure and anonymous transactions, anywhere in the world, and for both on and off the Internet transactions.

The especially preferred embodiment will now be described in even greater detail by reference to FIGS. 1 through 8.

FIG. 1 shows the physical layout for an especially preferred embodiment of the present electronic device or Universal Anonymous Credit Card (UACC) 1. The areal dimensions of the UACC 1 are 3.375"×2.125" or exactly those of a regular magnetic stripe credit card in use in electronic commerce today. The thickness of the UACC 1 varies from ~0.030" at the top where the magnetic stripe resides to 0.030"–0.060" for the rest of the card dependent upon the thickness of the LCD used (see FIG. 1). Besides the ON/OFF switch 3, the front side 2 of this UACC 1 has five (5) more functional switches, 4–8, labeled and defined as follows:

ATM (switch 4)=Reserved for Automatic Teller Machine (ATM) card

ACC (switch 5)=Reserved for Anonymous Credit Card (ACC or A-Card)

IC (switch 6)=Reserved for Internet Type II Cash

MC (switch 7)=Reserved for standard Magnetic Stripe Credit Card

BC (switch 8)=Reserved for A-Card transactions using bar codes

In addition to the switches 3–8, there is a 12-character keypad 9. The primary function of the keypad 9 is for the cardholder to enter the PIN into the UACC 1 for generating the ACCN for on and off Internet commerce transactions. There is also a 10- or more character alphanumeric liquid crystal display (LCD) 10 on the front side 2 of the UACC 1. This LCD 10 displays the alias and the ACCN for use for Internet commerce transactions or the alias and bar code representing the ACCN after the cardholder's PIN is entered. The display of the ACCN will automatically erase itself after about 2 minutes to avoid exposing significant information to third parties.

At the top of the back side 11 of UACC 1 is a standard 3-track magnetic stripe 12 found in every common magnetic stripe credit card in use today. Track-1 13 and track-3 14 are used to store the relevant information about the cardholder such as primary account number VCCN, name, expiration date, encrypted PIN etc. Track-2 15 of the magnetic stripe 12 normally contains only the cardholder's VCCN to be read by a magnetic stripe reader at the merchant's site. For the present UACC device, the ACCN, instead of the VCCN, will be generated on command by entering the PIN with the appropriate function switch "MC" 7 by a special encoder 16 located at a designated location underneath the magnetic strip 12. As will be explained in more detail below, the generated ACCN which resides temporarily on Track-2 15 of the magnetic stripe 12 will disappear automatically 2 minutes after it is being generated. This is to ensure that no significant information about the credit card account stays long enough for fraudsters to steal for committing subsequent credit card frauds.

Figure 2:
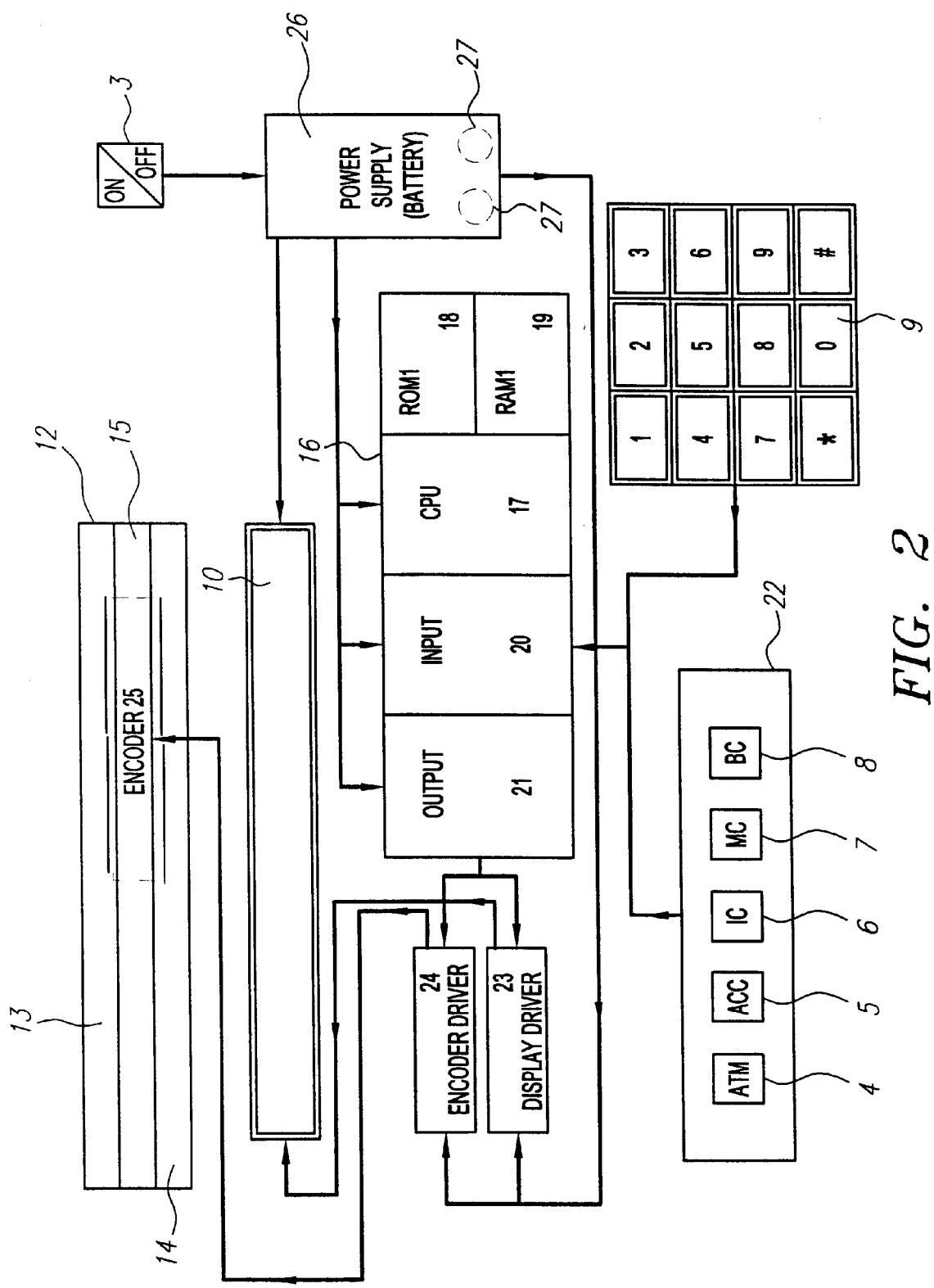
FIG. 2 is a system block diagram of a preferred embodiment of the Universal anonymous Credit card (UACC) in accordance with a preferred embodiment of the present invention.

The system block diagram for the especially preferred embodiment of the present invention is shown in FIG. 2. At the center of the system is a conventional 16-bit microprocessor 16 comprising a Central Processing Unit (CPU) 17, a Read-Only-Memory (ROM1) 18, a Random Access Memory (RAM1) 19, a 16-bit parallel Input Port (Input) 20 and a 16-bit parallel Output Port (Output) 21. The microprocessor 16 receives inputs through Input 20 from a bank of functional switches 22, which contains switches 4 through 8. The microprocessor also receives inputs from a 12-character keypad 9 through Input 20. Outputs from the microprocessor 16 emanate from Output 21 through a LCD display driver 23 to reach the 10- or more character alphanumeric LCD display 10 and also through an encoder driver 24 to reach a designated location of Track-2 15 of the magnetic stripe 12. Such a designated location of Track-2 15, where the encoder 25 is positioned, serves as a second RAM, RAM2, for the microprocessor 16. RAM2 stores the encoded ACCN needed for offline credit card transactions to be read by the merchant's standard decoding equipment very much like a conventional magnetic stripe credit card.

The software program for implementing the methodology provided by U.S. Pat. No. 5,956,699 for the cardholder to execute secured and anonymous credit card transactions on and off the Internet is installed into ROM1 18 of the microprocessor 16 during production of the current UACC unit. Information pertaining to the cardholder is encoded onto Track-1 13 and Track-3 14 of the magnetic stripe 12 which serves as an independent ROM, ROM2, for the UACC unit. Since information stored in ROM2 will be read with a standard magnetic stripe reader, it operates independently of the microprocessor 16. A battery supply 26 with contacts 27, controlled by the ON/OFF switch 3, completes the UACC system. The battery supply provides power to all the components of the UACC system, including the microprocessor 16, LCD display driver 23, encoder driver 24, LCD display 10 and the keypad 9.

Figure 3:
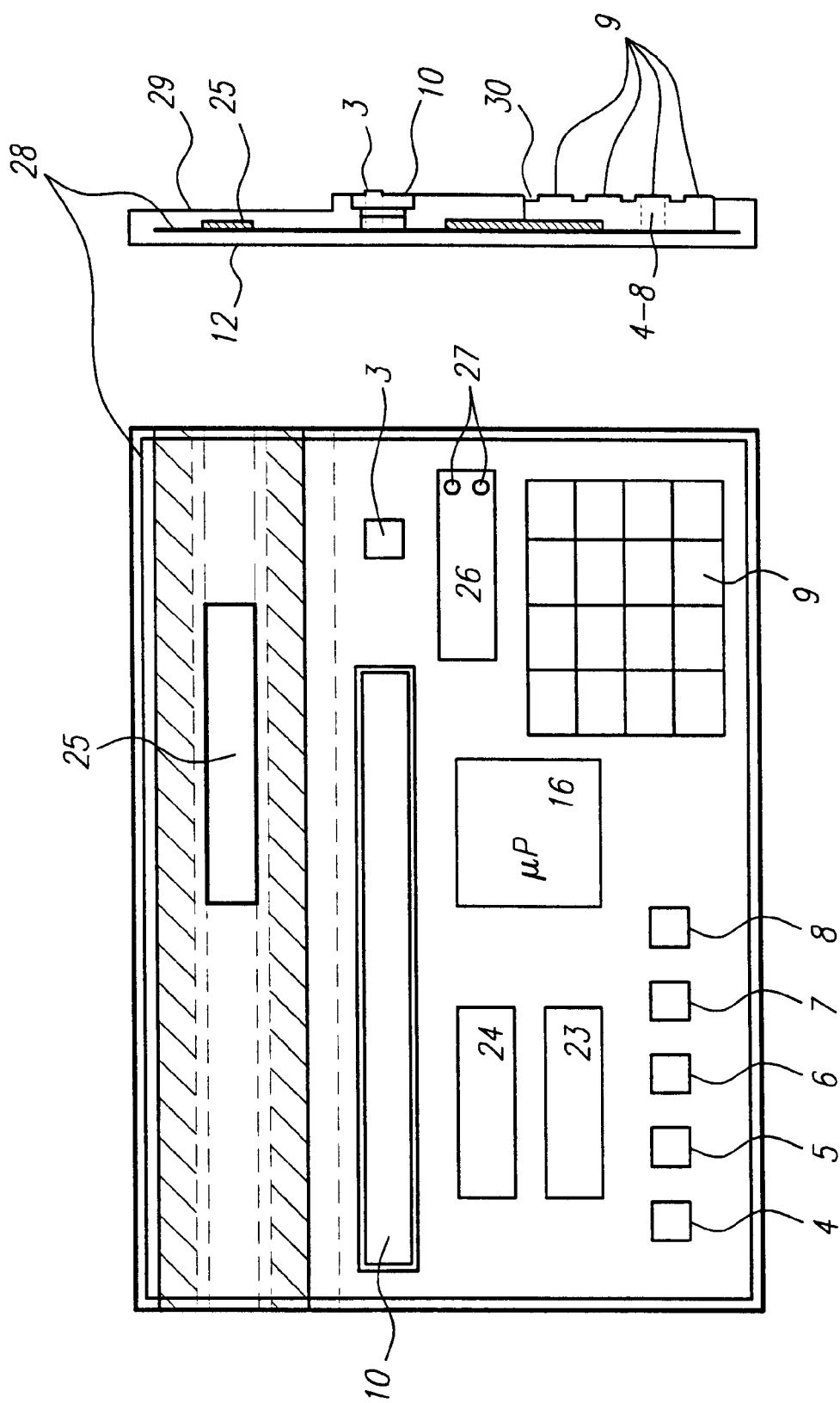
FIG. 3 is a physical layout of a preferred embodiment of the Universal anonymous Credit Card (UACC) in accordance with a preferred embodiment of the present invention.

FIG. 3 shows the physical layout and construction for the especially preferred embodiment of the present UACC device. All the electronic components of the system, namely the microprocessor 16, the LCD display 10, the keypad 9, LCD display driver 23, encoder driver 24, encoder 25, functional switches 4–8, ON/OFF switch 3 and battery contacts 27 with battery cell 26, are fabricated on a flexible multi-layered printed circuit board 28. The flexible printed circuit board 28 with all the loaded components is then encapsulated in plastic into thin 29 and thick 30 parallel sections as shown in FIG. 3. The thickness of the thin section 29 where the conventional magnet stripe 12 will be fabricated on top of the encoder 25 (to be explained in more detail below) on the backside is about 0.030", the same thickness as the magnetic stripe credit cards in use today. The plastic encapsulated thick section 30 (see FIG. 3), while holding the fully-loaded flexible printed circuit board 28 in place, allows the ON/OFF switch 3, functional switches 4–8 and the keypad 9 to be physically accessible (e.g. by fingers) from the front side of the UACC device. The LCD display 10 is also directly visible from the front side. Note that the thickness of the plastic encapsulated section would also be 0.030" thick if a polymer-backed (e.g. Mylar®) ultra-thin LCD display (0.020" thick typical) is used.

A much simplified theory on magnetic stripe technology, especially on how to encode (write) and decode (read) digital data respectively on and off a magnetic stripe used in ordinary credit cards of today, will now be provided in order to better explain how an encoder can be fabricated and work. A magnetic stripe is made out of a thin layer of very tiny ferromagnetic particles (typically 0.5 micron long) bound together with resin and subjected to a very strong magnetizing magnetic field (known as "coercivity") when such a stripe is printed onto a substrate. When the resin is cured or set, these tiny "magnets" are magnetically and permanently aligned (magnetized) into a series of South-North magnetic domains forming a chain of S-N, S-N . . . interfaces. The adjacent N-S magnetic fluxes of these magnetic domains are normally linked together for the entire magnetic stripe to act like a single magnet with South and North poles at its ends. In other words, an un-encoded magnetic stripe is actually a series of aligned South-North magnetic domains (see FIG. 4).

Figures 4, 5:
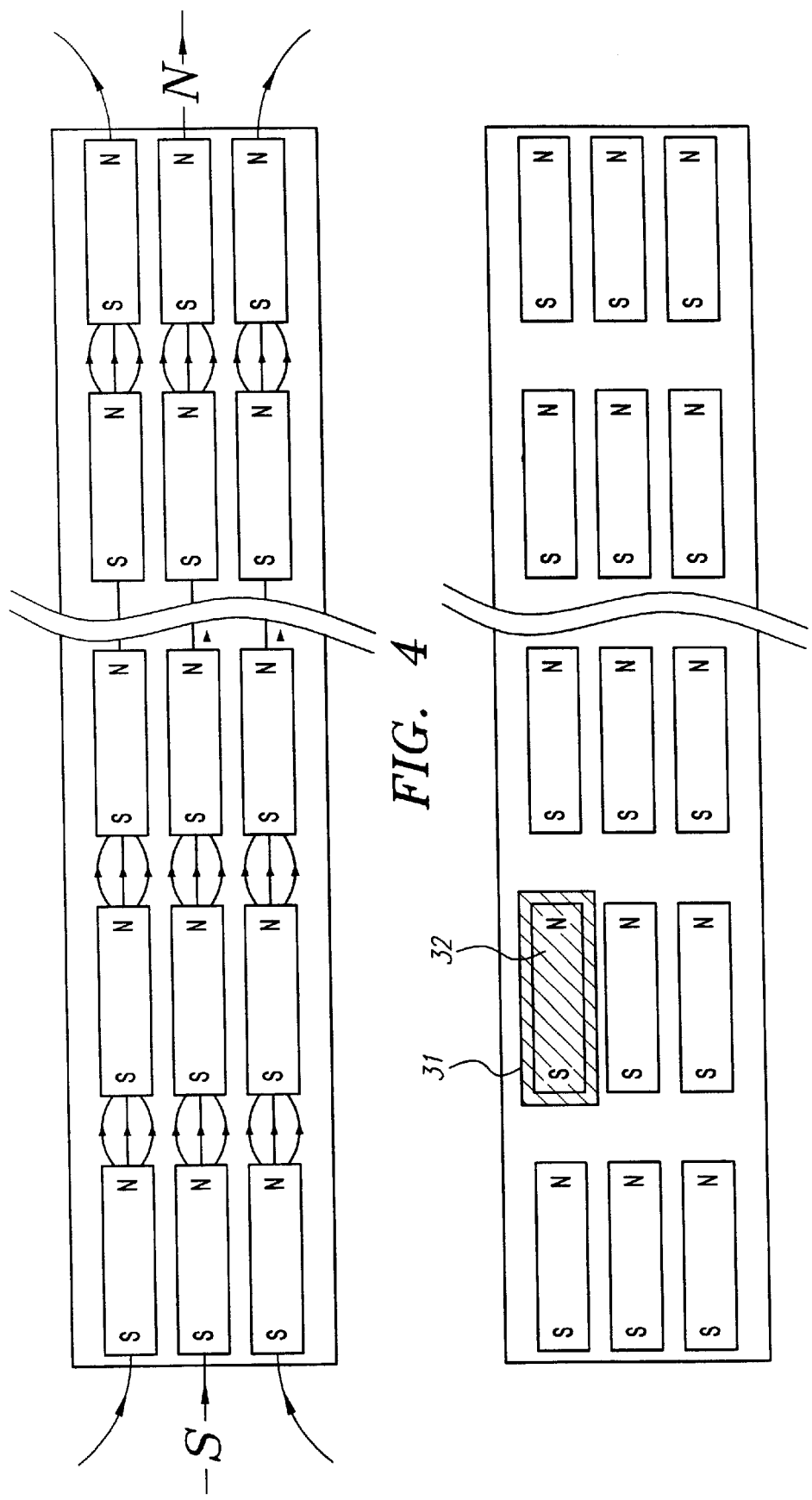
FIG. 4 shows an un-coded magnetic stripe likened to a series of aligned South-North magnetic domains.
FIG. 5 shows a sudden introduction of a strong magnet having an opposite orientation on top of a magnetic domain of the magnetic stripe causing flux reversals.
Figure 6:
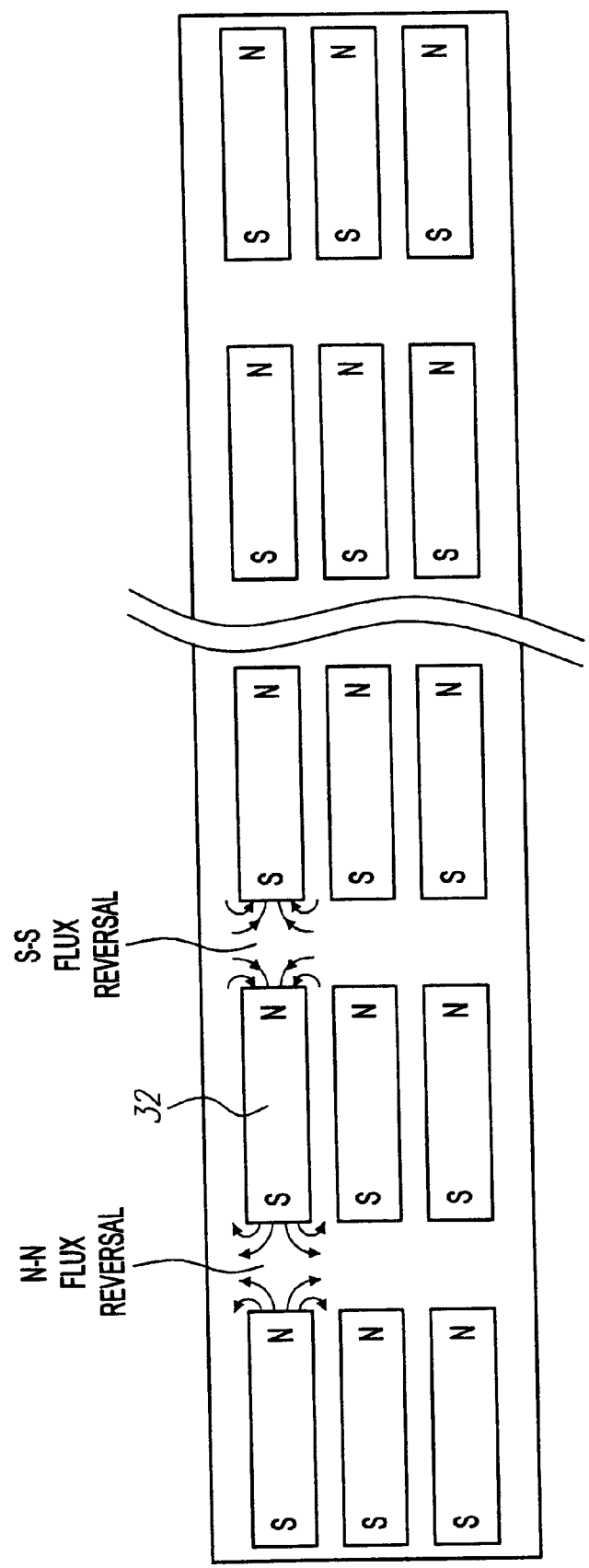
FIG. 6 shows flux reversals caused by sudden introduction of strong magnet having opposite magnetic orientation on top of a magnetic domain in a magnetic stripe.

If a N-N interface (instead of the normal N-S interface for un-encoded magnetic domains) is created somewhere on the stripe, the magnetic fluxes at the N-N interface will repel each other, resulting in a concentration or increase of flux lines around the N-N interface called a "flux reversal". The same situation exists for a S-S interface as compared with a normal N-S interface. Such a situation will take place if a strong magnetizing magnet 31 having an opposite magnetic orientation, namely N-S, is suddenly introduced on top of one of the S-N magnetic domains 32 of the magnetic stripe as shown in FIG. 5. The magnetic domain 32 will realign its magnetization as that of the strong magnet on top of it, namely N-S. Under this situation, two flux reversals have taken place, as illustrated in FIG. 6.

The process of encoding or writing involves the creation of N-N and S-S magnetic domain interfaces, or flux reversals, and the process of decoding or reading that of detecting them. Knowing that magnetic flux lines always emanate from the North pole and terminate on the South pole, a sudden introduction of a strong magnetic field (greater than the coercivity of the magnetic domains) having a N-S magnetic orientation can magnetize a normal S-N magnetic domain into N-S orientation, resulting in the creation of a pair of flux reversals S-S and N-N, much like that shown in FIG. 6 above.

Before proceeding to explain how the encoder of the especially preferred embodiment writes the ACCN on Track-2 15 of the magnetic stripe 12, it is helpful to delve deeper into the data storage mechanics of the magnetic stripe 12 itself. As stated earlier, the magnetic stripe 12 has three tracks, namely Track-1 13, Track-2 15 and Track-3 14. Digital data are stored in these three tracks according to the American National Standards Institute (ANSI) and International Standards Organization (ISO) BCD (5-bit Binary Coded Decimal Format) or ALPHA (alphanumeric) standards. The ANSI/ISO standards for Tracks 1, 2 and 3 are summarized in Table I as follows:

TABLE I

ANSI/ISO Track 1, 2, 3 Standards

| Track | Name | Density | Format | Characters | Function |
|---|---|---|---|---|---|
| 1 | IATA | 210 bpi | ALPHA | 79 | Read Name & Account |
| 2 | ABA | 75 bpi | BCD | 40 | Read Account |
| 3 | THRIFT | 210 bpi | BCD | 107 | Read Account & Encode |

Track-1 13, named after the "International Air Transport Association" (IATA), contains the cardholder's name as well as account and other discretionary data. Track-2 15, "American Banking Association" (ABA), is the most commonly used. This is the track that is read by ATMs and credit card checkers. The ABA designed the specifications of this track and it is believed all major world banks abide by it. It contains the cardholder's account number, encrypted PIN, plus other discretionary data. Track-3 14 is unique and intended to have data read from and written on it. At present, it is an orphaned standard and has not been widely used to date.

Before the encoder can write on command the ACCN on Track-2 15 of the magnetic stripe, attention must be paid to the data layout for Track-2 15. Encoding protocol specifies that each track must begin and end with a length of all Zero bits, called CLOCKING BITS. These are used to synchronize the self-clocking feature of bi-phase decoding, an industry standard. A typical Track-2 layout is shown as follows:.

0000000000000000; 1111222233334444= 9912****000000XXXX0000?

The symbol ";" after the "0's" is the "START SENTINEL" according to the BCD data format. The 4 digits "1111" following is the issuer or acquiring bank's identification number. The 12 digits following is the cardholder's account number. The symbol following is the "FIELD SEPARATOR" according to BCD data format. The 4 digits "9912" following is the expiration date. The four characters following "****" are data reserved for private use. The data length "XXXX" after the string of 0's may vary and is the encrypted PIN offset. Finally the symbol "?" after another string of 0's is "END SENTINEL".

The location of the 12 digits that need to be encoded or written on command is represented by "2222 33334444" on Track-2 15 of the magnetic stripe 12 in the example cited above.

Next, it is helpful to have an understanding of how the 12 digits are represented in BCD data format on Track-2 15 of the magnetic stripe 12. According to the BCD data format, each decimal digit is coded by 5 bits. The ANSI/ISO BCD Data Format is reproduced in Table II below. Note that all 21 digits, including the field separator, namely "1111222233334444=9912", can also be encoded on command if so desired.

TABLE II

ANSI/ISO BCD Data Format

| Data Bits | | | | Parity | | |
|---|---|---|---|---|---|---|
| b1 | b2 | b3 | b4 | b5 | Character[1] | Function |
| 0 | 0 | 0 | 0 | 1 | 0 (0 H) | Data |
| 1 | 0 | 0 | 0 | 0 | 1 (1 H) | Data |
| 0 | 1 | 0 | 0 | 0 | 2 (2 H) | Data |
| 1 | 1 | 0 | 0 | 1 | 3 (3 H) | Data |
| 0 | 0 | 1 | 0 | 0 | 4 (4 H) | Data |
| 1 | 0 | 1 | 0 | 1 | 5 (5 H) | Data |
| 0 | 1 | 1 | 0 | 1 | 6 (6 H) | Data |
| 1 | 1 | 1 | 0 | 0 | 7 (7 H) | Data |
| 0 | 0 | 0 | 1 | 0 | 8 (8 H) | Data |
| 1 | 0 | 0 | 1 | 1 | 9 (9 H) | Data |
| 0 | 1 | 0 | 1 | 1 | : (AH) | Control |
| 1 | 1 | 0 | 1 | 0 | ; (BH) | Start Sentinel |
| 0 | 0 | 1 | 1 | 1 | < (CH) | Control |
| 1 | 0 | 1 | 1 | 0 | = (DH) | Field Separator |
| 0 | 1 | 1 | 1 | 0 | > (EH) | Control |
| 1 | 1 | 1 | 1 | 1 | ? (FH) | End Sentinel |

Note 1. Hexadecimal conversions of the data bits are given in parenthesis (xH).

How BCD data is actually encoded onto Track-2 15 of the magnetic stripe 12 can now be explained. Table I above notes that Track-2 has a density of 75 bits per inch (bpi). According to the ANSI/ISO BCD data format, each character is represented by 5 bits. Thus, if the encoder needs to encode 12 digits (see "222233334444" in example above), it will require a total of 60 bits. Since the density is 75 bpi, the maximum physical space available for a stationary encoder head is 0.800". But the important dimension for the design of the encoder head is the space available for each BCD bit. In the present case, the bit dimension is 1,000 mils/75 bits or 13.33 mils (0.0133") per bit.

At this point, it is useful to explain with the help of FIGS. 7 A–D, how a single character or decimal digit comprising 5 bits in the ANSI/ISO BCD data format is encoded onto Track-2 15 of the magnetic stripe 12. FIG. 7A shows an un-encoded strip of Track-2 long enough to accommodate 5 bits of data. The physical length of this strip is 5×0.0133" or 0.0667" (66.65 mils). This un-encoded strip is divided into five segments, each representing a single bit, and each is further represented by two magnetic domains as shown in FIG. 7A. In accordance with the industry standard of encoding called Aiken Biphase, or "two frequency coherent-phase encoding", data is encoded in "bit cells" defined above and the frequency of which is the frequency of the '0' signals. '1' signals are exactly twice the frequency of the '0' signals. So, at least from the conventional way of decoding, the actual frequency of the data passing the 'READ' head will vary with the swipe speed, for the data density, control functions etc., the '0' frequency, however, will always be twice the '0' frequency. This is illustrated in FIG. 7B where the representation of all '1s', all '0s' and how '1' and '0' data exist side by side. Note that in FIG. 7B, the bit cell waveforms for '0' and '1' are the results of creating the so-called flux reversals of "N-N" or "S-S" at the magnetic domains interfaces of the un-encoded strip. For the stationary encoder of the present preferred embodiment, the encoding must be consistent with the Aiken Biphase convention because the same 'READ' heads will be used to decode the Track-2 data temporarily stored in UACC devices during offline (off the Internet) credit card transactions.

Figure 7C:
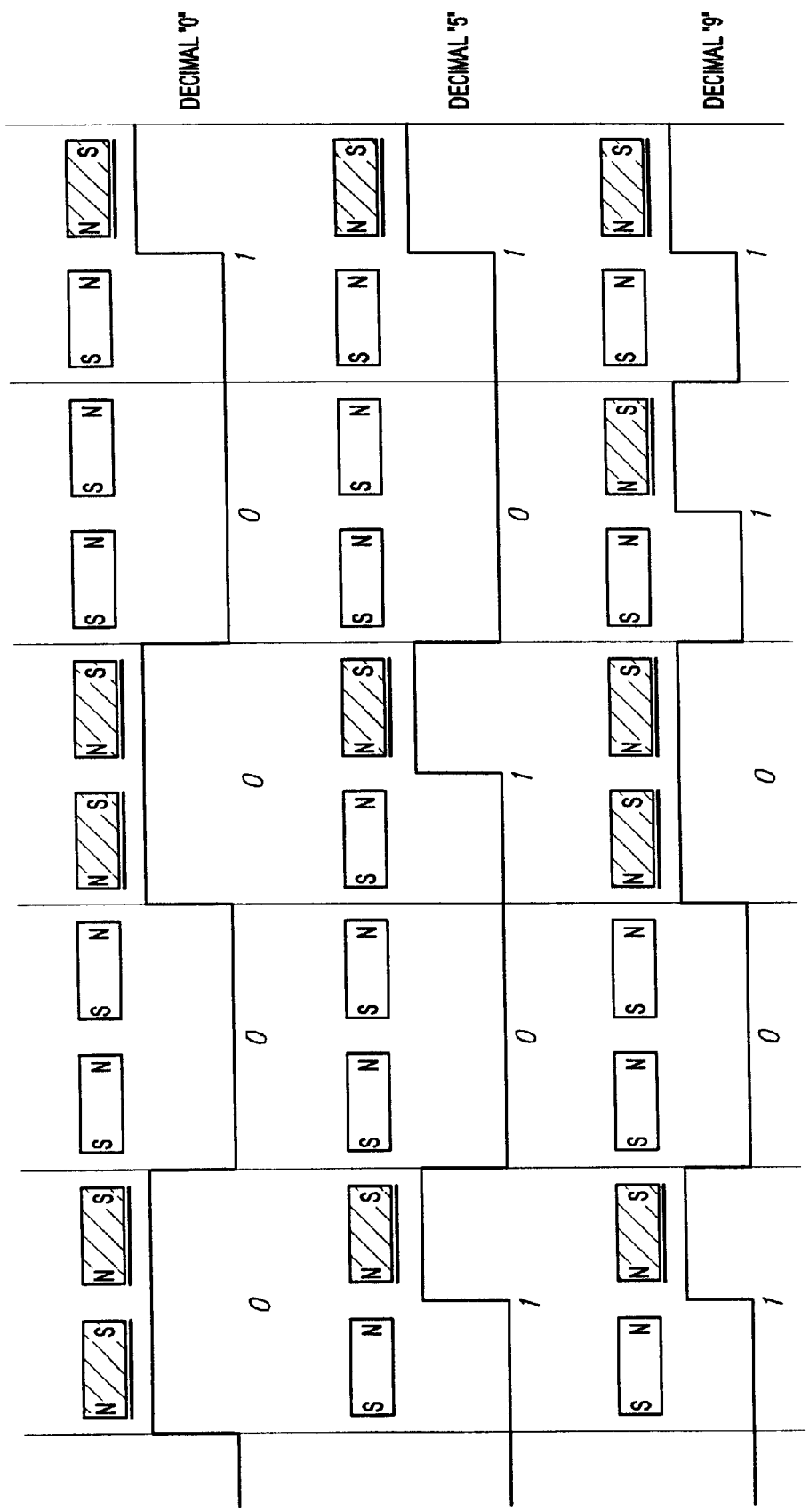
FIG. 7C shows a representation of decimals "0", "5" and "9" in the Aiken Biphase encoding standard.
Figure 7D:
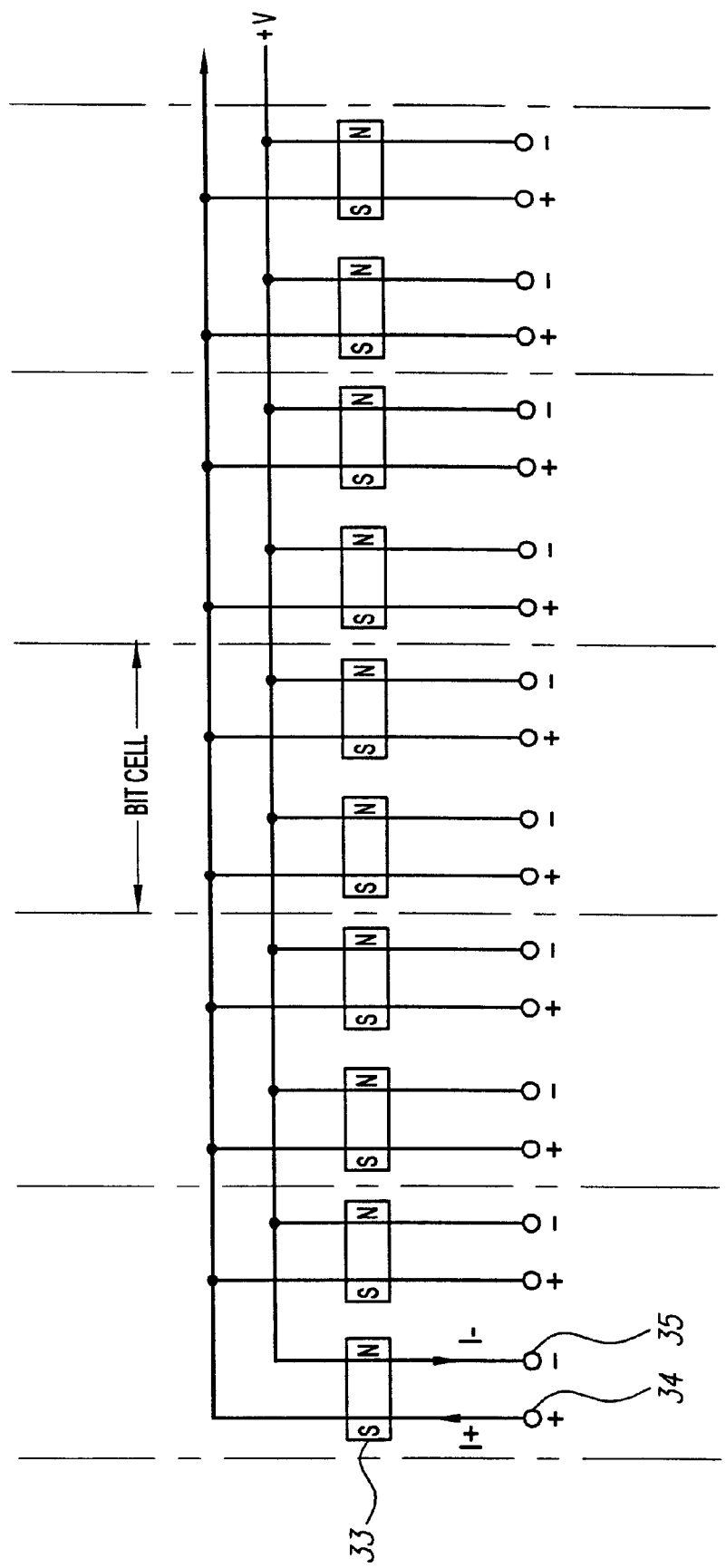
FIG. 7D shows a preferred embodiment of an encoder head of the present invention.

Consistent with the Aiken Biphase convention therefore, FIG. 7C shows, as an illustration, how BCD decimal digits '0', '5' and '9' would appear referenced to the un-encoded 5-bit strip of FIG. 7A. Also shown in FIG. 7C are the orientation of the magnetic domains and the flux reversals at the domain interfaces. Thus, if an encoder head of the present preferred embodiment is designed to be on top of the 10 magnetic domains representing the 5-bit decimal digit, it would be possible to magnetize on command the individual domains in order to create the appropriate flux reversals corresponding to the desired decimal digit. This is illustrated in FIG. 7D. The orientation of the magnetic domain 33 when un-coded is S-N as shown in FIG. 7D. The two contact bits 34 and 35 control which direction the magnetizing current is flowing. When 34 and 35 are suddenly made "1" and "1", current I+ will flow in from contact 34 to ground resulting in flipping the orientation of magnetic domain 33 to N-S. Meanwhile the current I− from "+V" to contact 35 is zero. When contact 34 and 35 are suddenly left open circuited, both I+ and I− are zero and the orientation of magnetic domain 33 will stay as N-S. When contacts 34 and 35 are suddenly changed to "0" and "0", current I− will flow from "+V" to contact 35 and cause the magnetic domain to revert back to S-N while I+ is zero. No domain flipping occurs if the bits for contacts 34 and 35 are either "1""0" or "0""1". In the former case, the magnetizing effect of I+ is neutralized by I−. Both I+ and I− are zero for the latter case. The magnitudes of currents I+ and I− needed to flip the magnetic domains with coercity of the order of 300–500 gausses ("soft" magnetic stripe found in conventional credit cards) for current carrying conductor of 1–2 microns thick are several hundred milliamperes. The electrical power required to encode or decode 12 decimal digits is of the order of tens microwatts.

In order to encode in the present example a total of 12 decimal digits, one would need to encode 5×12 or 60 bits of data. As shown in FIG. 7D, the encoder has to have two micro-heads per bit of data. Furthermore, each micro-head has a PLUS or MINUS polarity. If the polarity is PLUS, current will flow in one direction so as to generate a N-S magnetizing magnet. Similarly, if the polarity is MINUS, current will flow in the opposite direction so as to generate a S-N magnetizing magnet. So the encoder of the present preferred embodiment will have 2×60 micro-heads each with a PLUS and MINUS polarity. An especially preferred embodiment of the encoder with the driver electronics and logic is shown schematically in FIG. 8.

Figure 8:
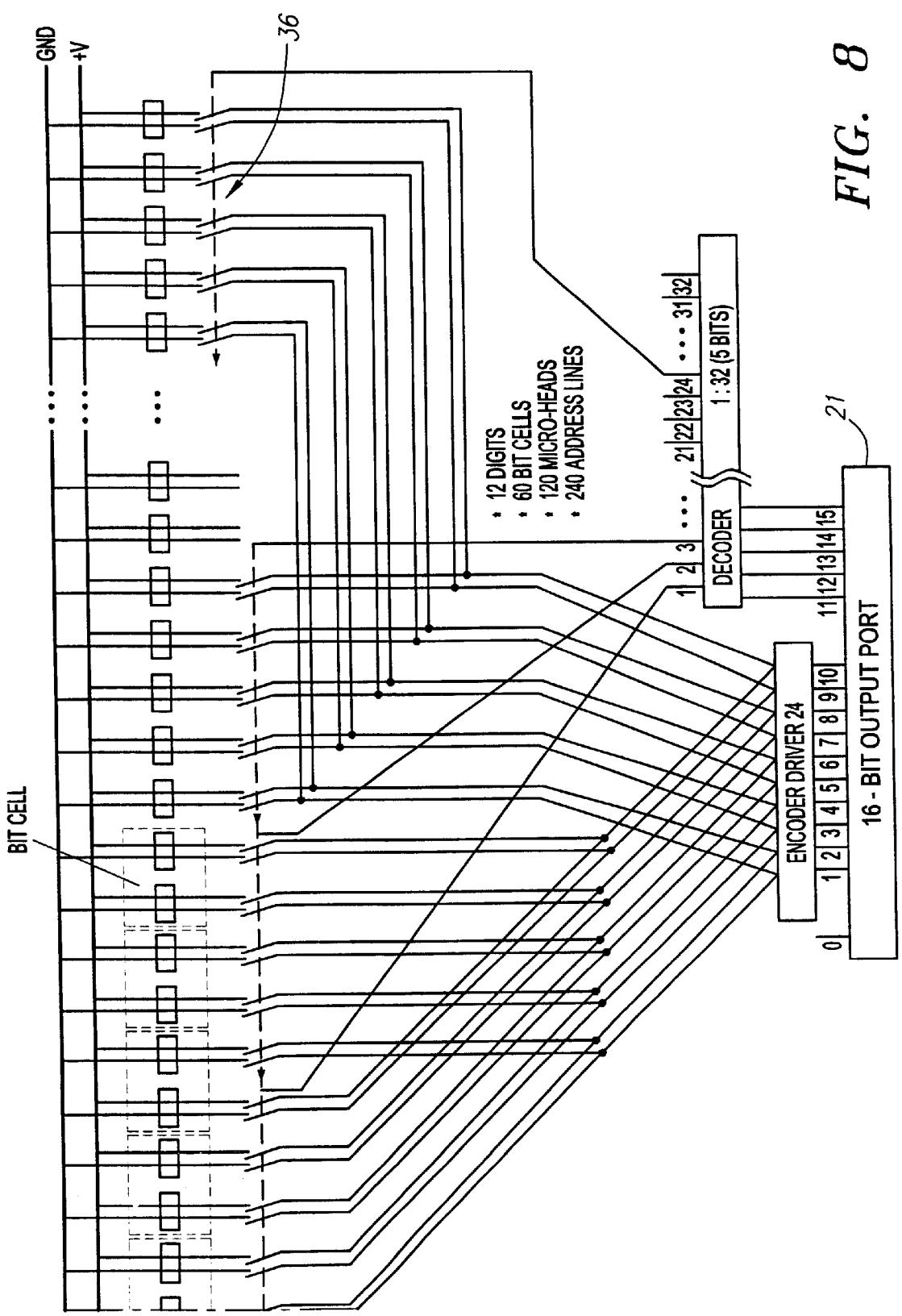
FIG. 8 shows a preferred embodiment of an encoder of the present invention with drive electronics and logic.

FIG. 8 shows the 12 decimal digits divided up into 60 bit cells with each bit cell comprising two magnetic domains and each having a PLUS and MINUS polarity. There are therefore a total of 120 magnetic domains that have to be addressed, each with two polarities, making it a total of 240 address lines as shown in FIG. 8. These addresses lines are accessed in bunches of 10 (5 magnetic domains or 2 1/2 bit cells). The address originates from using 10 bits of the 16-bit Output port 21 (see FIG. 2 of system block diagram for UACC) and then through the encoder driver 24 (also see FIG. 2) as current buffer before being connected to the 24 bunches of 10 address lines. Each of the 24 bunches of 10 address lines is accessed with a 32:1 decoder using five of the 16 bits of the Output parallel port 21. The decoder selects one of the 24 bunches of 10 address lines via switch bank 36 (there is a total of 24 switch banks similar to switch bank 36) comprising 10 switches each. In essence, it is the switch bank that selects which of the 10 address lines out of the 24 bunches that are being connected to the output of the encoder driver 24. Thus, it is possible to encode the 12 decimal digits into a designated location of Track-2 15 of the magnetic stripe with commands from the microprocessor and outputted through the parallel port 21 through the encoder driver 24. Such a software command is part of the methodology algorithm taught in U.S. Pat. No. 5,956,699 and stored in ROM1 (see FIG. 2) of the microprocessor 16. The stored algorithm generates the ACCN or, in essence, a "Coupon" (Customer's one-time unique purchase order number), from the valid credit card number VCCN and the cardholder's PIN when inserted properly into part of the VCCN.

The manner in which the Universal Anonymous Credit Card (UACC) will work under different on and offline transaction circumstances will now be described. It is first assumed that the cardholder has opened an UACC account with an issuer or acquiring bank. The cardholder has turned over a real name, address, personal and financial information to the issuer. In return, the cardholder is assigned a valid credit card number, VCCN, a credit limit, an Alias (chosen by the cardholder) and a proxy agent, and most importantly a cardholder UACC. The issuer has to assign the cardholder a proxy agent to use instead of giving out the cardholder's address in order to comply with the existing credit card transaction regulation. After obtaining a UACC from the issuer, the cardholder is now free to do anything and everything on and off the Internet safely with full assurance that nobody will find out what, where, when and how money is being spent with the UACC card, except its issuer.

The manner in which the cardholder can use his or her UACC to shop on the Internet will now be described. It is possible that not every online merchant will accept the UACC in the beginning, so the cardholder may have to identify those merchants that are partners with the UACC issuer bank. Otherwise, the transactions with the UACC will not be processed properly by the existing infrastructure that processes only conventional credit cards. Suppose the cardholder now wishes to purchase some merchandise from an online merchant who accepts UACC. All the cardholder has to send to the merchant's Web site online is his or her alias, a proxy agent's name assigned to the cardholder by the issuer bank, the ACCN or anonymous credit card number which will be obtained from the UACC (to be explained below), the merchandise and shipment choice. This is completely different from what the cardholder normally has to give out, viz. a real name, address and the valid credit card number, should the cardholder use a regular credit card. To obtain the ACCN from his UACC device, all the cardholder has to do is to first push the button "CC", which is reserved for Anonymous Credit Card transactions, then to enter the cardholder's PIN using the keypad and then the "#" key. In the LCD display, the alias will first be scrolled across the display followed by the 10-digit ACCN. Note that the first six digits (four digits are used to identify the issuer bank and two more digits to designate a specific BIN number) and the last four digits of the ACCN always remain the same as those in the VCCN which signifies the issuer's identification and credit card BIN number, and the expiration date respectively. The cardholder can then use this ACCN to complete the transaction with the online merchant. After the cardholder finishes using the ACCN, he or she can either erase it from the LCD display by pressing "*" followed by "#" in the keypad, otherwise the ACCN will disappear from the LCD display automatically after approximately 2 minutes.

As one can see from this transaction on the Internet using the UACC, the real name and address of the cardholder, including the credit card number itself, never appear on the Internet or even are made known to the merchant. Even though the ACCN or Coupon does appear, together with the alias of the cardholder, across the Internet during the online transaction, this ACCN or Coupon number does not stay the same, according to the methodology of U.S. Pat. No. 5,956,699, but changes automatically after every transaction or use. Thus, unlike all the other credit card transactions on the Internet today, no valid credit card numbers are actually available in transmission for theft by anybody. Only the ACCN or Coupon number will appear on any or all transaction records and that number is useless for any subsequent transactions because it is time variant.

For off the Internet transactions, the UACC behaves just like an ordinary credit card. The only difference is that before one hands over the UACC to the merchant for charging the amount, one enters one's PIN after pushing first the "MC" button on the UACC device, which is reserved for magnetic stripe credit card transactions, and then follows it with a "#" key on the keypad. It is assumed here that the cardholder is satisfied with what is being charged on the credit card before the cardholder, in effect, "signs" it digitally in the transaction. Unlike ordinary magnetic stripe credit cards of today, no personal hand signature is needed for off the Internet transactions with the UACC. By entering the PIN, the UACC automatically encodes temporarily the ACCN onto Track-2 of the magnetic stripe 12. The use of the resultant ACCN or Coupon is likened to the cardholder already signing the credit card with a personal digital signature for the transaction. The rest of the transaction simply follows that of a regular magnetic stripe credit card with the existing credit card processing infrastructure.

Thus, there has been described a Universal Anonymous Credit Card (UACC) device that is capable of allowing the cardholder to execute on and off the Internet secure and anonymous credit card transactions. Although the foregoing detailed description is illustrative of preferred embodiments of the present invention, it is to be understood that additional embodiments thereof will be obvious to those skilled in the art.

Accordingly, it will be readily apparent to those skilled in the art that still further changes and modifications in the actual concepts described herein can readily be made without departing from the spirit and scope of the disclosed inventions as defined by the following claims.

What is claimed is:

1. An electronic card, comprising:

a card base;

a computer affixed to the card;

a display controlled by the computer;

an input mechanism;

a magnetic storage medium affixed to the card that can be read by a standard magnetic stripe reader;

an encoder for generating a data packet that is stored in a designated portion of the magnetic storage medium; and a power source for supplying power to the computer and the encoder;

wherein the electronic card is sized such that the magnetic storage medium can be read by a standard magnetic stripe reader; and wherein the magnetic storage medium and the encoder are comprised of a dynamic thin film magnetic encoder.

2. An electronic card as recited in claim 1, wherein the card base is comprised of a flexible printed circuit board.

3. An electronic card as recited in claim 1, wherein the display is a liquid crystal display.

4. An electronic card as recited in claim 1, wherein the input mechanism is a keypad.

5. An electronic card as recited in claim 1, wherein the data packet is temporarily stored in the magnetic storage medium.

6. An electronic card as recited in claim 5, wherein the data packet can be erased by activation of an erasure mechanism.

7. An electronic card as recited in claim 1, further comprising:

a special function switch affixed to the card base that provides an input into the computer to control the function of the electronic card.

8. An electronic card as recited in claim 1, wherein the data packet is comprised of data representing a personal coupon and an alias that are readable by the standard magnetic stripe reader.

9. An electronic card as recited in claim 8, wherein the electronic card is a credit card.

10. An electronic card as recited in claim 1, wherein the electronic card is a security card used in a security system.

11. An electronic card as recited in claim 1, wherein the card base is comprised of a printed circuit board.

12. An electronic card as recited in claim 11, further comprising:

a protective film encapsulating at least a portion of the printed circuit board and the components attached to the printed circuit board.

13. An electronic card as recited in claim 1, wherein the data packet is comprised of data necessary to generate a personal coupon.

14. An electronic card, comprising:

a card base having a printed circuit board;

a computer affixed to the printed circuit board;

a display controlled by the computer;

a keypad attached to the card base for inputting information into the computer;

a magnetic storage medium affixed to the card that can be read by a standard magnetic stripe reader;

an encoder for generating a data packet that is stored in a designated portion of the magnetic storage medium; and a power source for supplying power to the computer and the encoder;

wherein the electronic card is sized such that the magnetic storage medium can be read by a standard magnetic stripe reader; and wherein the magnetic storage medium and the encoder are comprised of a dynamic thin film magnetic encoder.

15. An electronic card as recited in claim 14, wherein the data packet can be temporarily stored in and erased from the magnetic storage medium.

16. An electronic card as recited in claim 15, wherein the data packet is comprised of data representing a personal coupon that is readable by the standard magnetic stripe reader.

17. An electronic card as recited in claim 15, wherein the data packet is comprised of data representing an alias that is readable by the standard magnetic stripe reader.

18. An electronic card as recited in claim 11, further comprising:

a protective film encapsulating at least a portion of the printed circuit board and the components attached to the printed circuit board.

* * * * *